(No Model.)
D. BEHMER.
PRUNING IMPLEMENT.
No. 500,526. Patented June 27, 1893.
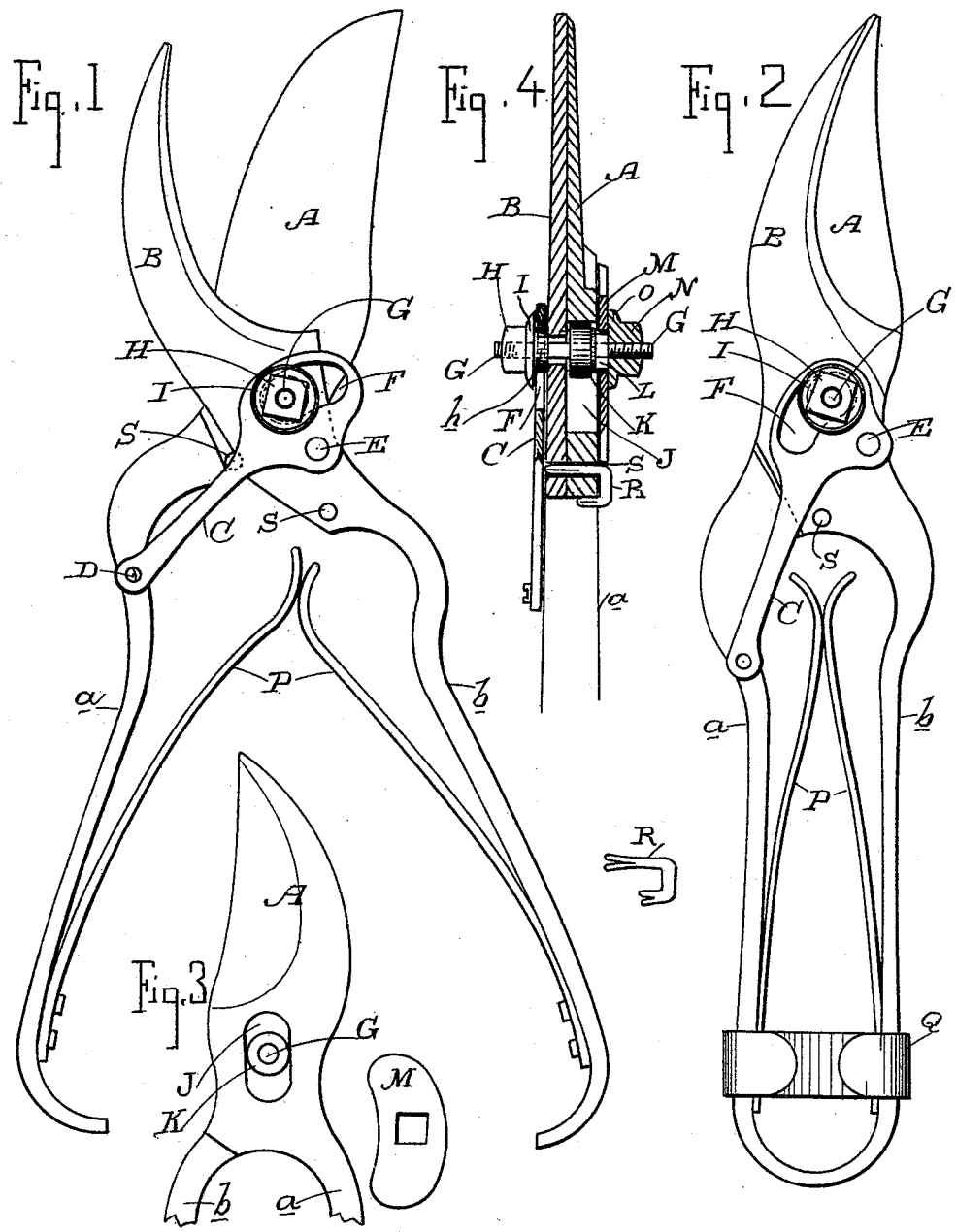
Witnesses:
J. H. Kruse
J. A. Bayless
Inventor,
Daniel Behmer
By Dewey & Co.
Attys

UNITED STATES PATENT OFFICE.

DANIEL BEHMER, OF SANTA ROSA, ASSIGNOR OF TWO-THIRDS TO ADOLPH BLAICH, OF SAN FRANCISCO, CALIFORNIA.

PRUNING IMPLEMENT.

SPECIFICATION forming part of Letters Patent No. 500,526, dated June 27, 1893.

Application filed September 19, 1892. Serial No. 446,333. (No model.)

*To all whom it may concern:*

Be it known that I, DANIEL BEHMER, a citizen of the United States, residing at Santa Rosa, Sonoma county, State of California, have invented an Improvement in Pruning-Shears; and I hereby declare the following to be a full, clear, and exact description of the same.

My invention relates to the class of pruning shears, and it consists in certain details of construction in the implement which will be more fully described by reference to the accompanying drawings, in which—

Figure 1 is a side view of the shears showing the connecting link and fulcrum pins, the shears being open. Fig. 2 is a similar side view showing the shears closed. Fig. 3 is a view taken from the opposite side. Fig. 4 is a section taken through the point of crossing.

The object of my invention is to provide a pruning shears the blades of which are so connected together as to produce a drawing cut when they are closed upon the article to be severed.

A and B are two blades of the implement having the handles $a$ and $b$ respectively.

C is a link, one end of which is fulcrumed to the handle $a$ at the point D, and the other end to a point E on the handle $b$ near its junction with the base of the blade. The end of the link C which lies upon the junction of the blade B with its handle, is considerably enlarged as shown, and has a curved slot F made in it, the pin E being the radius about which the curvature of the slot is formed. Through this slot passes a pin G and a nut H is screwed upon the pin. This nut has a cylindrical portion $h$ extending through the slot F and when the nut is screwed firmly to place, it rests against the side of the blade B, while a washer I which is formed with the nut, and which is of larger diameter than the slot F, lies just outside of the slotted portion of the link and serves as a guide for the link in its movements about its fulcrum pin E. The cylindrical portion of the nut extending through the slot and screwing firmly against the side of the blade, prevents the washer from pressing upon the link, and this allows the latter a free movement beneath it while it is held in proper position. That part between the blade A and the handle $a$ has a straight slot J made in it, and through this slot the pin G extends, being also screw-threaded at its outer end. Upon this pin, within the slot J, is fitted an antifriction roller K which turns loosely upon that portion of the pin. This roller is retained in place by a nut L which screws down close to it upon the outer threaded end of the pin on this side.

In order to protect the slot and the roller from dirt and dust I have shown a plate M which is fitted upon a square portion of the pin G, so that it is prevented from turning and retained in position to cover the slot. Exterior to this plate is a nut N which screws upon the outer end of the pin, the nut having a washer O formed with it and resting upon the exterior of the plate M, thus steadying and holding it in place.

Between the handles $a$ and $b$ are fixed the springs P, the outer ends being secured firmly to the interior faces of the handles near the outer ends, and the inner ends being curved and resting against each other, as shown, so that the pressure tends to keep the blades of the shears open while pressure upon the handles will cause the springs to yield and allow the blades to close.

The inner edge of the blade A is made convex, and the inner edge of the blade B is made concave as shown.

The operation of the shears will then be as follows: When the handles are closed together, the link C being pivoted at E to the handle $b$ and having its opposite end pivoted to the side of the handle $a$, it will be manifest that when the blades are moved toward each other, the blade A will be moved about the pivot pin E by reason of the connecting link, and as this pin is out of line with the center pin G, it will be seen that the blade A will be drawn backwardly as it is closed toward the blade B, and will thus execute a drawing cut between the edges of the blades. During this movement, the slotted portion of the link C moves in a curved line about the pin G, while the slotted portion of the blade A travels upon the anti-friction roller on the pin and is thus guided in its movement and retained in place by the joint action of the roller and the fulcrum pin E of the link. By this device I provide a very effective and simple pruning shears. When not in use and closed together the handles may be retained by means of a clasp Q of the usual or any suitable construction. I have also shown another device which consists of a pin R made like a staple having a long and a short arm, the ends of which are split and elastic. A hole S is made through the two parts $a$ and $b$, just behind the fulcrum pin E, and when the handles are closed together, the holes S are in line so that the longer arm of R can be introduced and will lock the handles together in a closed position. When the staple is withdrawn the handles are free to move, and the short arm of the staple is introduced into the hole. As it does not extend all the way through the handle $a$, it will not lock the handles when in this position, but will remain in place on account of the elasticity of the split end and this prevents its being lost.

Having thus described my invention, what I claim as new, and desire to secure by Letters Patent, is—

1. In a pruning shears, the blades A, B, having the handles $a$ $b$, crossing each other at their junction, one of said blades having a slot, a link having one end fulcrumed to one of the handles, and the other end to the opposite handle nearer the crossing point, said link having a slot formed in it with the fulcrum pin as its radius, a pin secured to the blade B passing through said slot with the anti-frictional device and a holding nut, substantially as herein described.

2. In a pruning shears, the blades A and B with handles crossing each other, a link, one end of which is pivoted to the handle $a$ at a distance from the crossing point, and the other end is pivoted to the handle $b$ at a point near the crossing, a curved slot made in the link with the fulcrum pin E as its radius, a pin passing through the crossing point behind the blade B having a nut and washer screwed upon its outer end serving as a guide for the movement of the slotted link, a slot made in the crossing point of the blade A, an anti-frictional roller journaled upon the pin where it passes through this slot, a plate covering said slot and a nut whereby it is held in place, substantially as herein described.

3. In a pruning shears, the opposing curved blades having handles crossing each other and connected together by a link fulcrumed to one of the handles at a point distant from the crossing, and to the other handle at a point near the crossing, a guide pin fixed in one of the blades at a point forward of said fulcrum pin, and passing through a slot made in the other blade, and through a curved slot in the connecting link, an anti-friction roller journaled upon said pin within the slot in the blade, and nuts and washers screwing upon opposite ends of the pin whereby the parts are retained in position and guided in their movements, springs fixed between the handles acting to normally separate the blades and yielding to allow them to be closed when pressure is applied to the handles and means for locking the handles together, substantially as herein described.

4. A pruning shears consisting of blades fulcrumed together to open and close about the fulcrum pin, springs between the handles by which they are normally forced apart, holes S made through the handles behind the fulcrum pin, so as to be in line with each other when the handles are closed, and a locking staple R fitting the holes, substantially as herein described.

In witness whereof I have hereunto set my hand.

DANIEL BEHMER.

Witnesses:
S. H. NOURSE,
J. A. BAYLESS.